US011996599B2

(12) United States Patent
Facchini et al.

(10) Patent No.: US 11,996,599 B2
(45) Date of Patent: May 28, 2024

(54) RESONANT CAVITY FILTERS INCLUDING COUPLING TUNING BY RESONATOR ROTATION

(71) Applicant: CommScope Italy S.r.l., Agrate Brianza (IT)

(72) Inventors: Andrea Facchini, Milan (IT); Luca Bonato, Lazzate (IT); Yrjo Erkki Hugg, Arcore (IT); Roman Tkadlec, Falašské Klobouky (CZ)

(73) Assignee: CommScope Italy S.r.l. (IT)

( * ) Notice: Subject to any disclaimer, the term of this patent is extended or adjusted under 35 U.S.C. 154(b) by 233 days.

(21) Appl. No.: 17/628,319

(22) PCT Filed: Jul. 30, 2020

(86) PCT No.: PCT/EP2020/071466
§ 371 (c)(1),
(2) Date: Jan. 19, 2022

(87) PCT Pub. No.: WO2021/023610
PCT Pub. Date: Feb. 11, 2021

(65) Prior Publication Data

US 2022/0255207 A1 Aug. 11, 2022

Related U.S. Application Data

(60) Provisional application No. 62/882,888, filed on Aug. 5, 2019.

(51) Int. Cl.
*H01P 1/208* (2006.01)
*H01P 7/06* (2006.01)
*H03H 7/06* (2006.01)

(52) U.S. Cl.
CPC ............ *H01P 1/208* (2013.01); *H01P 1/2084* (2013.01); *H01P 7/06* (2013.01)

(58) Field of Classification Search
CPC .. H01P 7/06; H01P 1/207; H01P 1/208; H01P 1/2084
USPC ................................ 333/202, 203, 208–212
See application file for complete search history.

(56) References Cited

U.S. PATENT DOCUMENTS

2018/0277920 A1 9/2018 Wong
2019/0140334 A1 * 5/2019 Tkadlec .................... H01P 7/04

FOREIGN PATENT DOCUMENTS

EP 3035435 A1 6/2016
WO 2010033057 A1 3/2010

OTHER PUBLICATIONS

Notification of Transmittal of the International Search Report and the Written Opinion of the International Searching Authority, or the Declaration, in corresponding PCT Application No. PCT/EP2020/071466 (Oct. 22, 2020).

* cited by examiner

*Primary Examiner* — Rakesh B Patel
(74) *Attorney, Agent, or Firm* — Myers Bigel, P.A.

(57) ABSTRACT

A resonant cavity filter includes a filter housing defining an internal cavity therein, a resonating element in the internal cavity of the filter housing, and a coupling transmission line extending adjacent a periphery of the resonating element in the internal cavity of the filter housing. The resonating element is rotatable relative to the coupling transmission line to vary an electromagnetic coupling therebetween. Related devices and methods of operation are also discussed.

18 Claims, 14 Drawing Sheets

RESONANT CAVITY FILTERS INCLUDING COUPLING TUNING BY RESONATOR ROTATION

CLAIM OF PRIORITY

This application is a 35 U.S.C. § 371 national stage application of PCT Application No. PCT/EP2020/071466, filed on Jul. 30, 2020, which claims priority to U.S. Provisional Patent Application No. 62/882,888, filed Aug. 5, 2019, the disclosures of which are hereby incorporated herein by reference. The above-referenced PCT Application was published in the English language as International Publication No. WO 2021/023610 A1 on Feb. 11, 2021.

FIELD

The present invention relates generally to communications systems and, more particularly, to filter assemblies that are suitable for use in radio frequency (RF) communications.

BACKGROUND

Cellular base stations can use phased array antennas that include a linear array of radiating elements. Typically, each radiating element is used to (i) transmit RF signals that are received from a transmit port of an associated radio and (ii) receive RF signals from mobile users and pass these received signals to a receive port of the associated radio. Filter assemblies may be used to connect both the transmit and receive ports of a radio to one or more radiating elements of a multi-element antenna. For example, a "duplexer" refers to a known type of three-port filter assembly that is used to isolate the RF transmission paths to the transmit and receive ports of the radio from each other while allowing both RF transmission paths access to the radiating element(s) of the antenna.

One type of filter for RF applications is a resonant cavity filter comprising an assemblage of coaxial resonators, where the overall transfer function of the resonant cavity filter is a function of the responses of the individual resonators as well as the electromagnetic coupling between different pairs of resonators within the assemblage.

FIG. 1 is a perspective view of a conventional resonant cavity filter assembly 50. FIG. 2 is a perspective view of the conventional filter assembly 50 of FIG. 2 with the cover plate 78 removed therefrom. FIG. 3 is a perspective view of the filter assembly 50 of FIGS. 2-3 with the top cover and resonators removed to more clearly show the cavities within the filter housing.

Referring to FIGS. 1-3, the filter assembly 50 includes a housing 60 that has a floor 62 and a plurality of sidewalls 64. An interior ledge 66 is formed around the periphery of the housing 60. Internal walls 68 extend upwardly from the floor 62 to divide the interior of the housing 60 into a plurality of cavities 70. Coupling windows 72 are formed within the walls 68, and these windows 72 as well as openings between the walls 68 allow communication between the cavities 70. Internally-threaded columns 74 and resonating elements 76 (also referred to herein as resonators) are provided within the housing 60. The resonating elements 76 may include, for example, dielectric resonators or coaxial metal resonators, and may be mounted onto selected ones of the internally threaded columns 74. A cover plate 78 acts as a top cover for the duplexer 50. Screws 80 are used to tightly hold the cover plate 78 into place so that the cover plate 78 continuously contacts the interior ledge 66 and the top surfaces of the walls 68.

The duplexer 50 further includes an input port, an output port and a common port (shown as one or more of 82, 84, 86, depending on configuration). The input port may be attached to an output port of a transmit path phase shifter (not shown) via a first cabling connection. The output port may be attached to an input port of a receive path phase shifter via a second cabling connection. The common port may connect the duplexer 50 to one or more radiating elements of the antenna (not shown) via a third cabling connection (not shown). Tuning screws 90 are also provided. The tuning screws 90 may be adjusted to tune aspects of the frequency response of the duplexer 50 such as, for example, the center frequency of the notch in the filter response, such that the filter may reject or attenuate signals in a stop band frequency range around the center frequency. It should be noted that the device of FIGS. 1-3 illustrates two duplexers that share a common housing, which is why the device includes more than three ports (the device includes a total of six ports, although all of the ports are not visible in the views of FIGS. 1-3).

FIG. 4A is a perspective view of an alternative resonant cavity filter assembly 150 with the top cover removed to more clearly show the cavities 170-1 to 170-4 (collectively 170) within the filter housing 160. Referring to FIG. 4A, internal walls 168 divide the interior of the housing 160 into a plurality of cavities 170, each including a respective resonator 176, arranged in an in-line configuration between input and output ports at opposing ends of the housing 160.

FIG. 4B is a perspective view of a conventional tuning screw shown mounted in a top covers of a filter. Referring to FIG. 4B, a tuning screw 100 is shown mounted in a top cover 120 of a filter housing. The top cover 120 has a plurality of apertures 130 extending therethrough, which may be threaded. Two apertures 130 are depicted in FIG. 4B, one of which has the tuning screw 100 inserted therein. A threaded nut 140 may be provided above each aperture 130. Tuning screws 100 can be threaded through the respective apertures 130 (only one tuning screw 100 is shown). The tuning screws 100 can readily be threaded further into or further out of the threaded apertures 130, and hence into or out of the cavity of the filter, and the nuts 140 may be used to fix the screws 100 in a desired position, which may facilitate very precise tuning of the filter. In other embodiments a thicker top cover 120 may be used that has threaded apertures formed therein, which may eliminate the separate threaded nuts 140.

SUMMARY

According to some embodiments of the present invention, a resonant cavity filter includes a filter housing defining an internal cavity therein, a resonating element in the internal cavity of the filter housing, and a coupling transmission line extending adjacent a periphery of the resonating element in the internal cavity of the filter housing. The resonating element is rotatable relative to the coupling transmission line to vary an electromagnetic coupling therebetween.

According to some embodiments of the present invention, a resonant cavity filter includes a filter housing defining a plurality of internal cavities therein, and a respective resonating element in each of the internal cavities of the filter housing. The respective resonating element includes a base that is rotatably mounted to a floor of the internal cavity, a resonator head that is opposite the base, and a rim laterally protruding from an edge of the resonating element between the base and the resonator head, where the rim extends around less than an entirety of a periphery of the resonating element.

According to some embodiments of the present invention, a method of tuning a resonant cavity filter includes rotating a resonating element in an internal cavity of a filter housing of the resonant cavity filter relative to a coupling transmission line in the internal cavity of the filter housing extending adjacent a periphery of the resonating element to vary an electromagnetic coupling therebetween.

Further features, advantages and details of the present disclosure, including any and all combinations of the embodiments described herein, will be appreciated by those of ordinary skill in the art from a reading of the figures and the detailed description of the embodiments that follow, such description being merely illustrative of the present invention.

DETAILED DESCRIPTION

Figure 1:
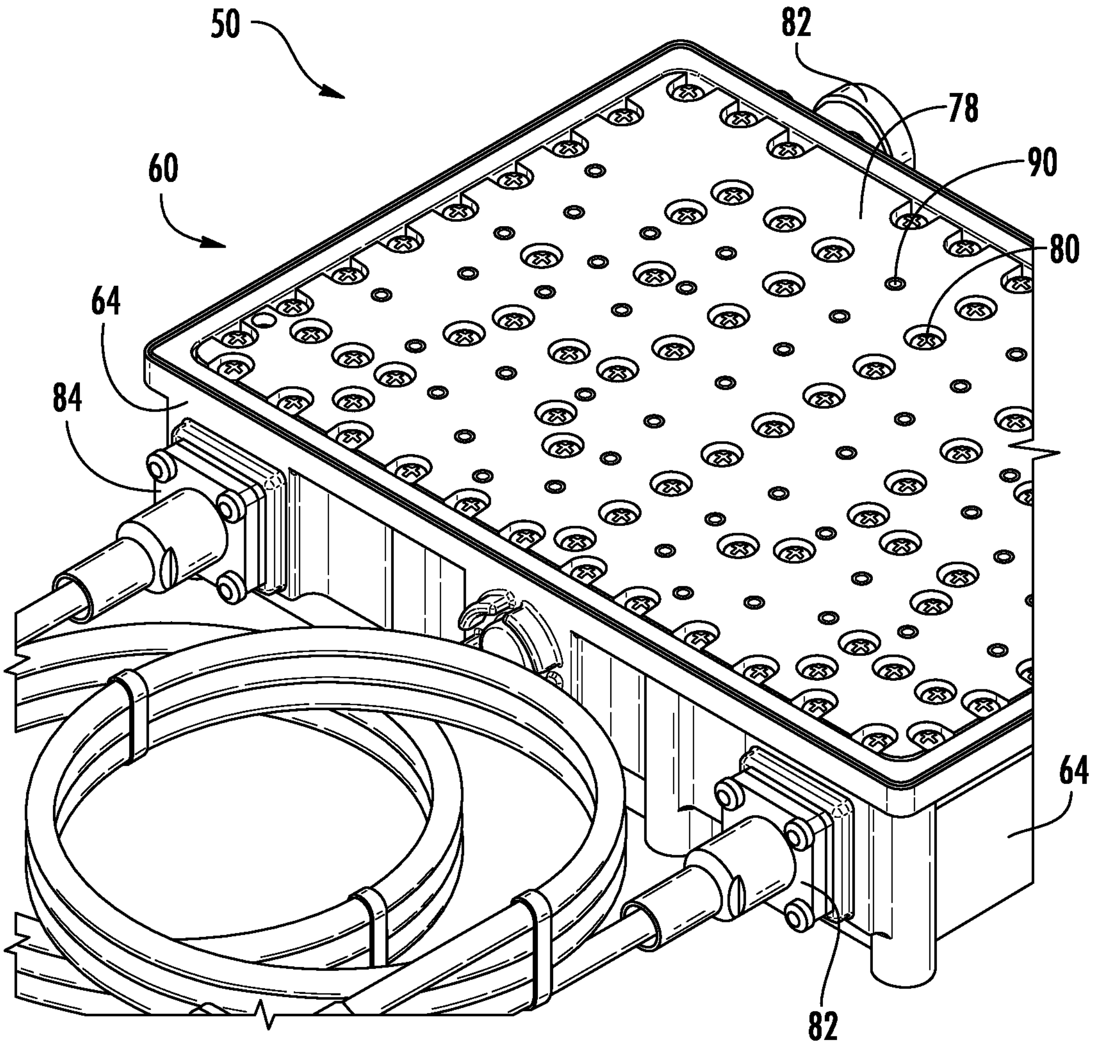
FIG. 1 PRIOR ART
FIG. 1 is a perspective view of a conventional resonant cavity filter assembly.
Figure 2:
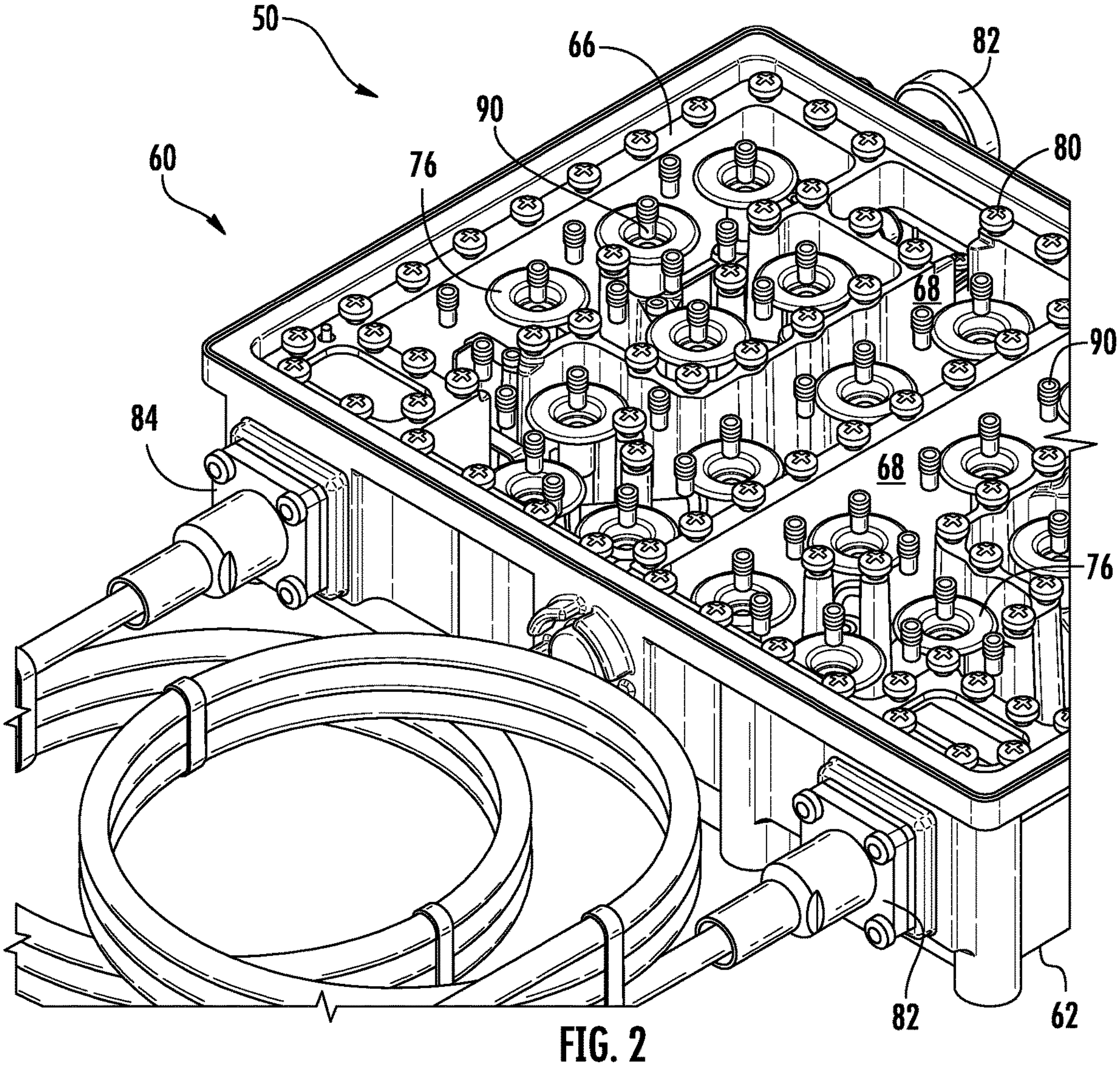
FIG. 2 PRIOR ART
FIG. 2 is a perspective view of the conventional resonant cavity filter assembly of FIG. 1 with the cover plate removed therefrom.
Figure 3:
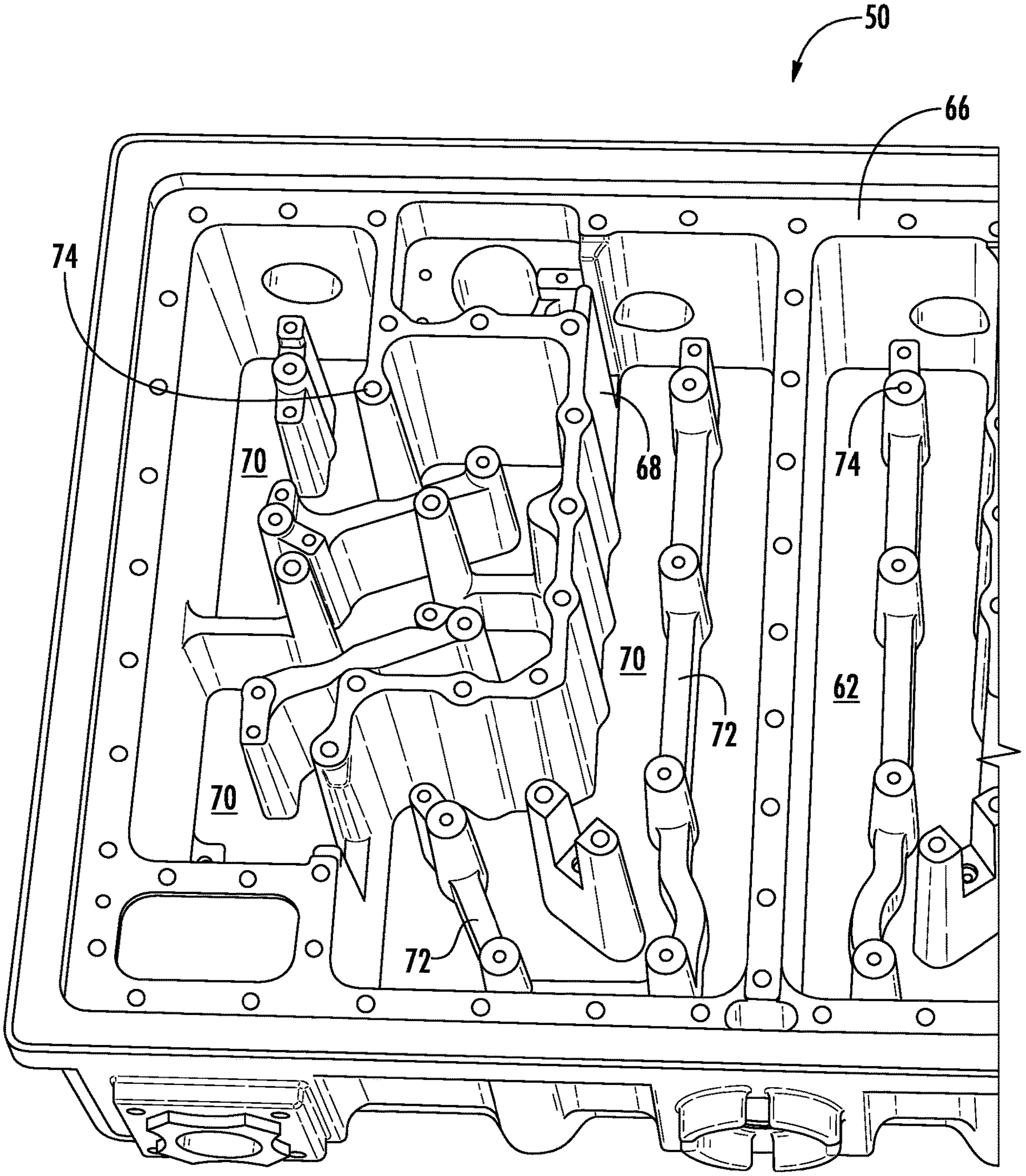
FIG. 3 PRIOR ART
FIG. 3 is a perspective view of the conventional resonant cavity filter assembly of FIGS. 1-2 with the top cover and resonators removed.
Figure 4A:
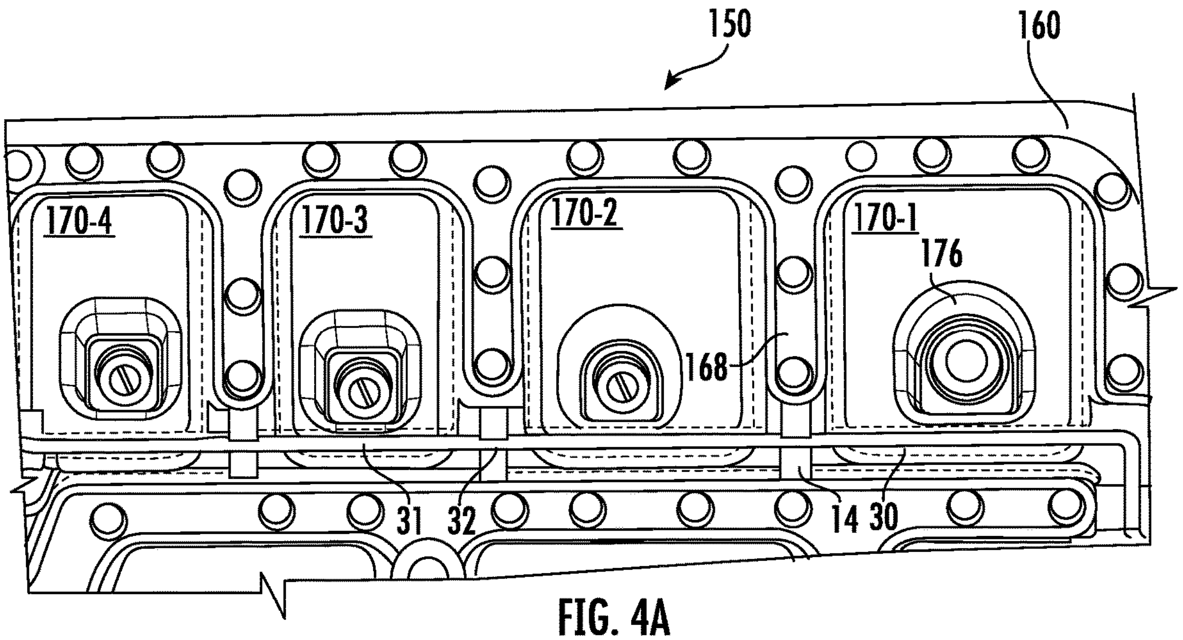
FIG. 4A PRIOR ART
FIG. 4A is a perspective view of an alternative conventional resonant cavity filter assembly.
Figure 4B:
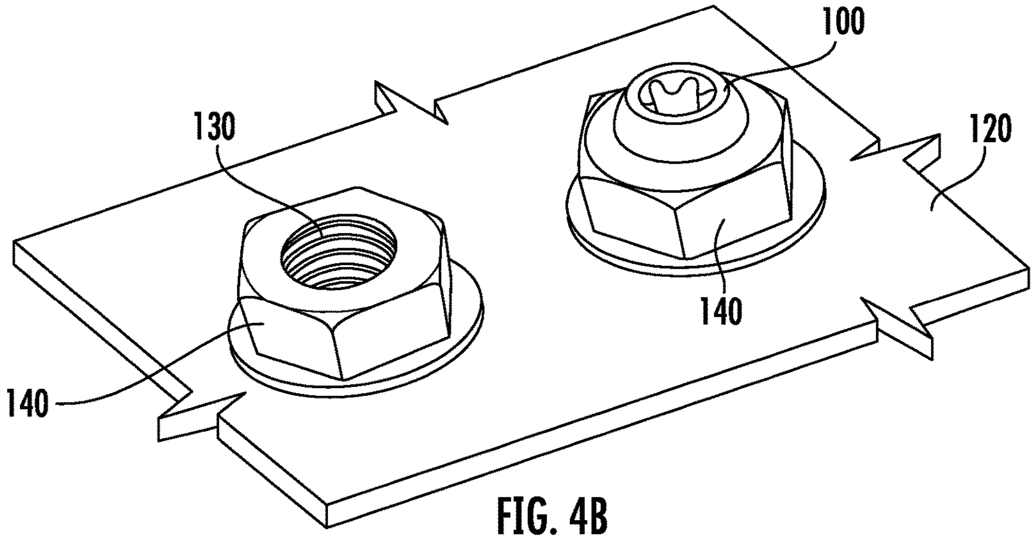
FIG. 4B PRIOR ART
FIG. 4B is a perspective view of a conventional tuning screw shown mounted in top cover of a filter.

Embodiments of the present invention are directed to methods of tuning notch couplings to alter the frequency response of a resonant cavity RF filter, such that the filter (also referred to as a band-stop filter) may reject or attenuate signals in a stop band frequency range. In particular, embodiments described herein provide apparatus and methods that can alter the electromagnetic coupling (including capacitive and/or inductive coupling; generally referred to herein as coupling) between a stripline (generally referred to herein as a coupling transmission line) and an adjacent resonating element (also referred to herein as a resonator). The resonating element and the coupling transmission line are rotatable relative to one another to vary the coupling therebetween. For example, the resonating element may be rotatable among respective positions having varying plan view overlap relative to an adjacent coupling transmission line, such that the respective positions alter the coupling between the resonating element and the coupling transmission line. The coupling transmission line may extend between multiple resonator elements to provide coupling therebetween, and/or may be coupled to a main RF transmission line that extends between input and output ports of the resonant cavity filter.

Passive Intermodulation ("PIM") distortion is a known effect that may occur when multiple RF signals are transmitted through a communications system. PIM distortion may occur when two or more RF signals encounter non-linear electrical junctions or materials along an RF transmission path. Such non-linearities may act like a mixer, causing new RF signals to be generated at mathematical combinations of the original RF signals. If the newly generated RF signals fall within the bandwidth of existing RF signals, the noise level experienced by those existing RF signals may be effectively increased. When the noise level is increased, it may be necessary reduce the data rate and/or the quality of service.

PIM distortion can be a significant interconnection quality characteristic for an RF communications system, as PIM distortion generated by a single low quality interconnection may degrade the electrical performance of the entire RF communications system. Thus, ensuring that components used in RF communications systems generate acceptably low levels of PIM distortion may be desirable. In particular, minimizing and controlling the effects of PIM distortion may be used to achieve high end performance. PIM performance may also be a recognized market differentiator and provides competitive advantage, enabling increased data transfer efficiency.

PIM can be generated by many factors. One possible source of PIM distortion may be due to inconsistent metal-to-metal contact along an RF transmission path. For example, conventional tuning screws, which may be used to tune the center frequency and/or other aspects of the frequency response for a resonant cavity filter, may form metal-to-metal contacts where the metal screws are threaded into a mating metallic nut of the filter housing. It is standard practice to tune the filter to a desired frequency response through the careful placement of apposite tuning screws in a position that provides the desired tuning effect. This process slowly brings the filter from detuned to tuned condition by continuous re-touching of screws position. Given the strong RF interactions within each screw and other screws, the tuner may continuously move one screw, then move another screw, and subsequently move the same screw or screws multiple times.

Coupling transmission lines that extend above or underneath a portion of a resonator (for example, a top portion, also referred to herein as a "head" of the resonator) in a resonant cavity filter can also provide strong couplings between a main RF transmission line and the resonator. However, such an arrangement may be sensitive to differences in mutual or relative distances between the filter body, resonators, striplines and/or other components of the resonant filter assembly, due to: (i) manufacturing tolerances with respect to the dimensions of the components; (ii) assembling tolerances with respect to the positioning of the components; and (iii) thermal drift with respect to relative expansion or contraction of components over operating temperature, particularly where the components may have different coefficients of thermal expansion (CTE).

Embodiments of the present invention provide tuning apparatus and methods to address such tolerance related issues. In particular, resonant cavity filters are provided that have elements that are configured for tuning the coupling between a resonating element and a coupling transmission line extending adjacent the resonator element. Moreover, to address thermal drift effects, some embodiments include a dielectric support that maintains a fixed mutual distance between the resonator and the coupling transmission line, in some embodiments, using an s-shaped dielectric support. The resonant cavity filters may be duplexers, diplexers, combiners, or the like, which are suitable for use in cellular communications systems and other applications.

Figure 5:
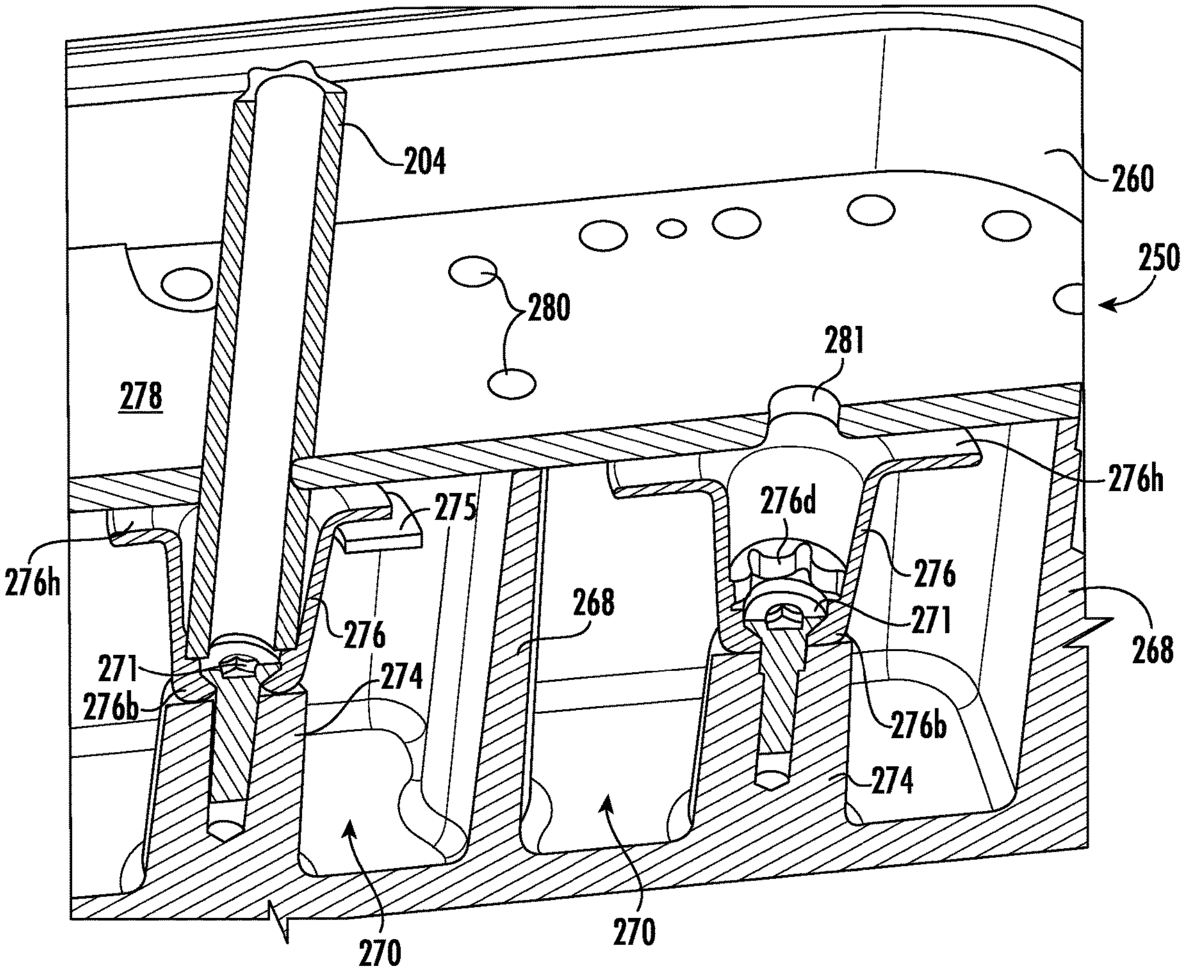
FIG. 5 is a sectioned perspective view of a resonant cavity filter including resonating elements and coupling transmission lines according to some embodiments of the present invention.
Figure 6:
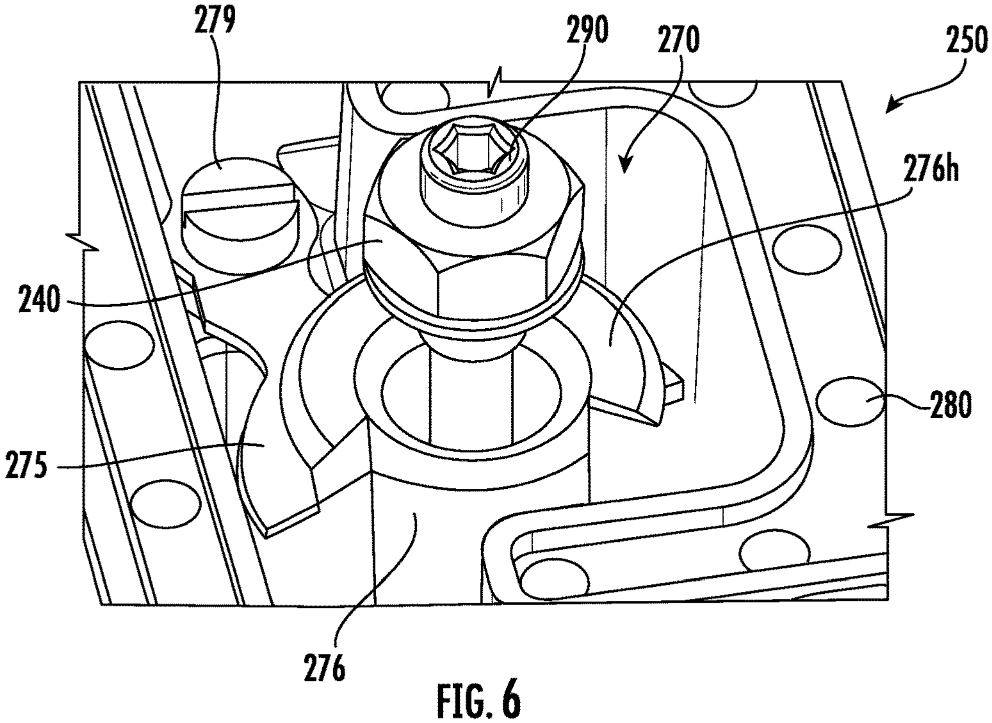
FIG. 6 is a perspective view of one of the resonating elements, coupling transmission lines, and tuning elements of a resonant cavity filter according to some embodiments of the present invention.

FIG. 5 is a sectioned perspective view of a resonant cavity filter including resonating elements according to some embodiments of the present invention. FIG. 6 is a perspective view of one of the resonating elements and tuning elements of the resonant cavity filter of FIG. 5, with the top cover removed. As shown in FIG. 5, a resonant cavity filter assembly 250 includes a filter housing 260 and a cover plate 278 that acts as a top cover of the filter assembly 250. Internal walls 268 divide or partition the interior of the housing 260 into a plurality of internal cavities 270 arranged in an in-line configuration between input and output ports (not shown) at opposing ends of the housing 260. Internally-threaded columns 274, hollow resonating elements or resonators 276, and coupling transmission lines (also referred to herein as striplines) 275 are provided within each cavity 270 of the housing 260. Screws 279 (which may be plastic or other non-conductive material in some embodiments) may be used to secure the coupling transmission lines 275 to the housing 260. Screws may also be inserted into openings 280 to tightly hold the cover plate 278 into place so that the cover plate 278 continuously contacts an interior ledge and the top surfaces of the walls 268.

Figure 14A:
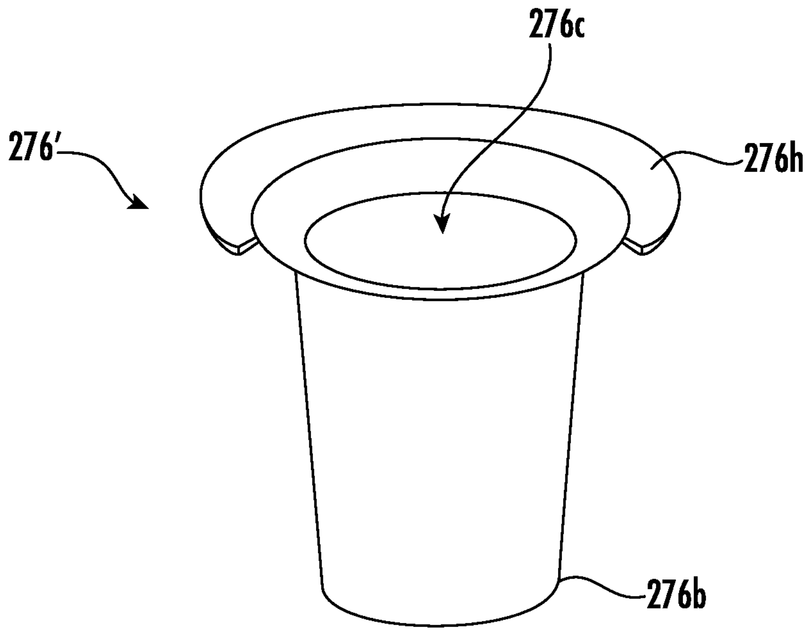
FIGS. 14A, 14B, and 14C illustrate example resonating elements according to some embodiments of the present invention in greater detail.
Figure 14B:
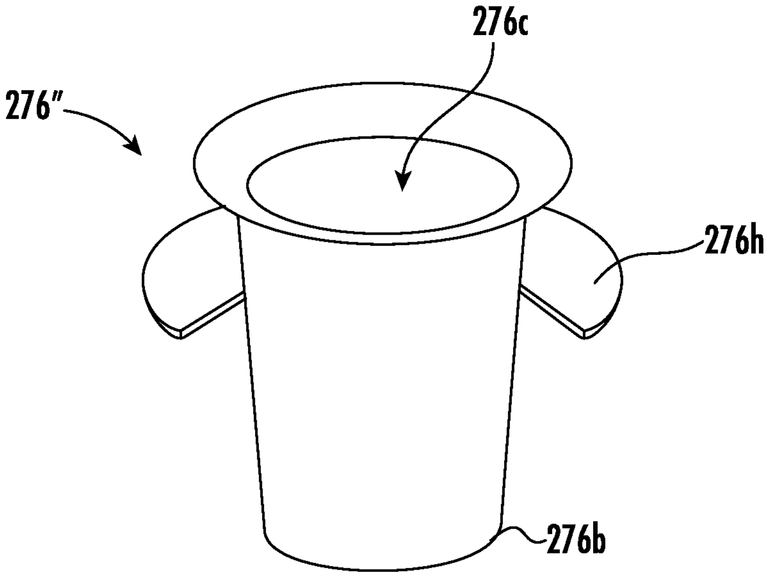
Figure 14C:
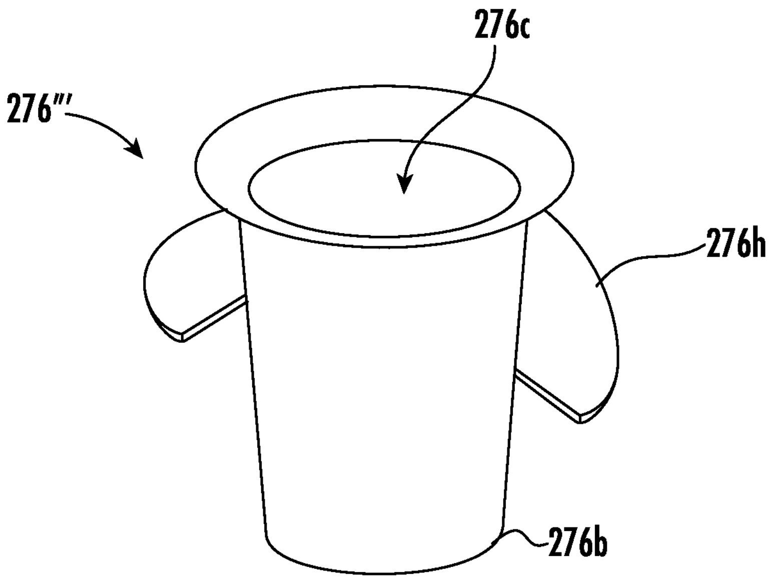

In the examples of FIGS. 5 and 6, each of the cavities 270 includes a respective resonating element 276 that is attached to a respective internally-threaded column 274 by a fixing screw 271. The resonating element 276 does not contact the sidewalls of the cavity 270. FIGS. 14A, 14B, and 14C illustrate example resonating elements 276', 276'', and 276''', respectively, in greater detail. The resonating elements 276', 276'', 276''' (where reference designator 276 may refer to any of 276', 276'', and/or 276''' herein) may include, for example, dielectric or coaxial metal resonators. The interior of each resonating element 276 defines a cavity 276*c* that is open toward the top cover 278 of the housing 260, into which a tuning element 290 may extend. The body of the resonating element 276 includes a first portion 276*h* and a second portion 276*b*, which are separated along a longitudinal axis that extends substantially perpendicular to the floor and top cover 278 of the housing 260. The first portion 276*h* includes a rim or flange that laterally protrudes from an edge of the resonating element 276 around less than an entirety of the periphery of the resonating element 276. The second portion 276*b* provides a base of the resonator 276, and includes an opening that is sized to accept the fixing screw 271 or other member for attachment to the floor of the cavity 270. In FIG. 14A, the first portion 276*h* is a top portion or "head" of the resonator (also referred to herein as resonator head 276*h*). In FIG. 14B, the first portion 276*h* is a middle portion or "rib" of the resonator 276. In FIG. 14C, the first portion 276*h* extends in a partial spiral shape around the resonator 276 with varying distances between the head and the base 276*b*. While described hereinafter primarily with reference to resonating elements configured as shown in the embodiment of FIG. 14A, it will be understood that resonating elements configured as shown in the embodiment of FIG. 14B and/or FIG. 14C may be similarly used in any of the embodiments described herein.

Referring again to FIGS. 5 and 6, the resonator head 276*h* and/or the stripline 275 may be shaped to provide varying amounts of overlap (in plan view) responsive to rotation of the head 276*h* relative to the stripline 275. For example, the resonator head 276*h* may have a shape that is configured to increase or decrease coupling with the stripline 275, depending on the position of the head 276*h* relative to the stripline 275. As shown in the example of FIG. 6, the head 276*h* defines a crescent-shaped or "moon"-shaped rim, which extends partially but not completely along the periphery of the top portion of the resonating element 276. The rotation of the head 276*h* may thus change the overall electromagnetic coupling that is created between the stripline 275 and the resonator 276, based on the amount of overlap between the head 276*h* and the stripline 275 in plan view.

The resonator 276 may be designed or otherwise configured such that rotation of the resonator 276 can be accomplished from outside of the housing 260, by inserting one or more tools into openings 281 without removing the top cover 278. As shown in the example of FIG. 5, rotation of the resonator 276 may be performed using a tool or jig 204, which may be inserted from or through a coaxially-aligned opening 281 in the top cover 278. In particular embodiments, the base 276*b* of the resonator 276 may include a patterned driving structure 276*d* (illustrated as a star-shape by way of example) that is shaped to mate with the tuning tool or jig 204, which can be inserted and turned to effect precise rotation of the head 276*h*. In some embodiments, the jig 204 may be a dielectric material, in order to avoid damage to the resonating element 276 (e.g., due to metal-to-metal contact) and/or to reduce or prevent short circuit of the resonators 276 while observing RF performance changes during rotation. The patterned driving structure 276*d* may be concentrically arranged with or otherwise configured to allow access to the underlying fixing screw 271, to permit loosening or tightening of the fixing screw 271 through the opening 281 (e.g., by inserting a screwdriver).

For example, rotation of the head 276*h* may include loosening the fixing screw 271 at the base 276*b* of the resonator 276, inserting the jig 204 through the coaxially-aligned opening 281 in the cover 278 and into the interior of the resonator 276 to mate with the driving structure 276*d*, turning the jig 204 to effect a desired amount of rotation of the resonator 276 (that is, to provide a desired plan view overlap of the head 276*h* relative to the stripline 275), withdrawing the jig 204 from the interior of the resonator 276 through the opening 281, and tightening the fixing screw 271 to secure the resonator 276 in the desired position. In some instances, these operations may be performed iteratively, as tuning itself is iterative, and as the resonators 276 may be detuned during tightening of the fixing screw 271. In embodiments where the tuning jig 204 is a dielectric material, the rotation of the resonator 276 may be performed in conjunction with the tightening of the fixing screw 271 by a screwdriver, e.g., by inserting the screwdriver into a hollow interior of the tuning jig 204 to tighten the fixing screw 271 while the position of the resonator 276 is held in place by the tuning jig 204. A tuning element 290 (shown as a frequency tuning screw) may be inserted through the coaxially-aligned opening 281 in the cover 278 and adjusted to tune a resonance frequency of the resonator 276, for example, by controlling the distance of penetration or extension of the tuning element 290 into the interior of the resonating element 276.

Figure 10:
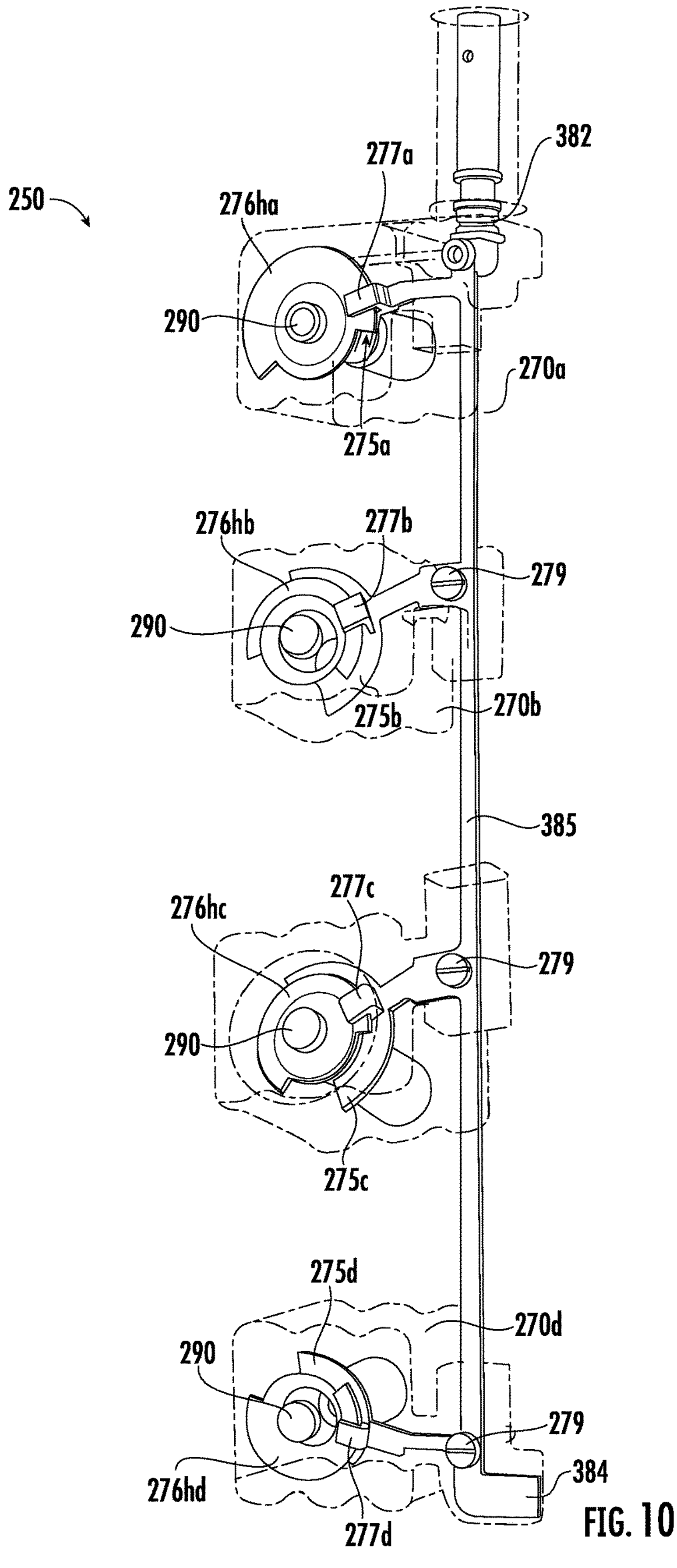
FIG. 10 is a perspective view of a resonant cavity filter including resonating elements and coupling transmission lines according to some embodiments of the present invention.
Figure 11:
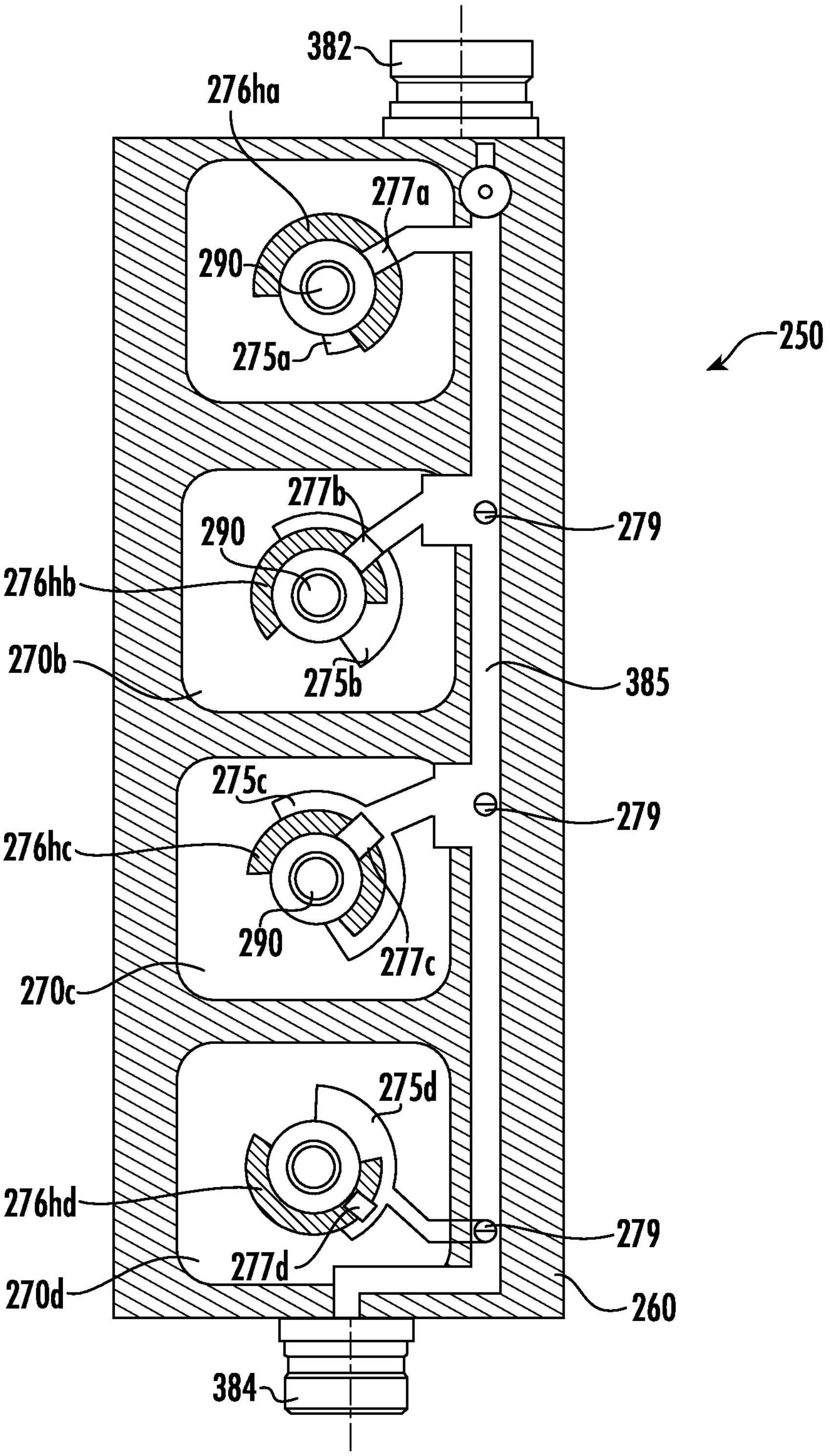
FIG. 11 is a plan view of the resonant cavity filter of FIG. 10.
Figure 12:
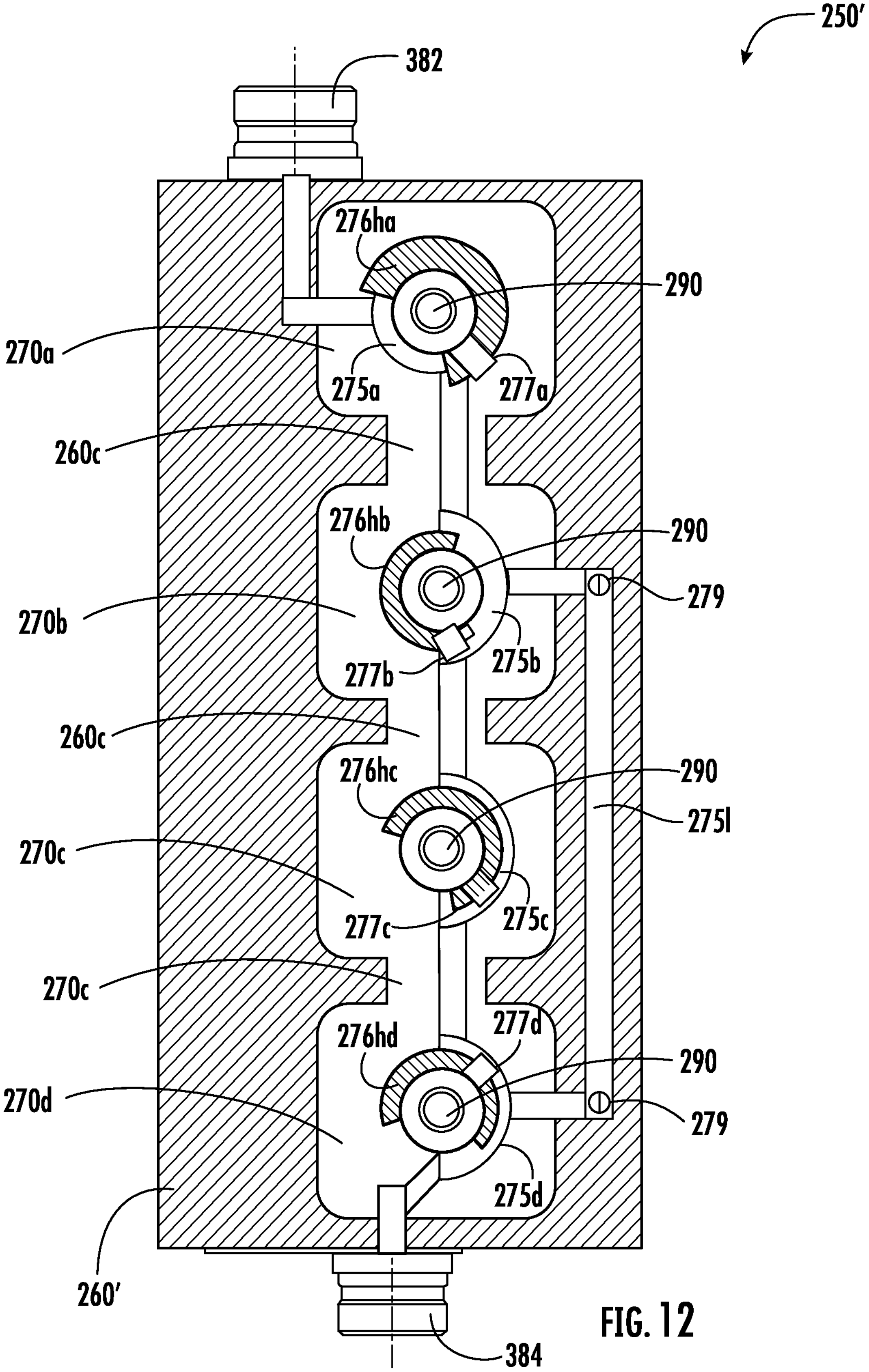
FIGS. 12 and 13 are plan views of resonant cavity filters including resonating elements and coupling transmission lines according to further embodiments of the present invention.

The above-described operations of adjusting the rotation of the resonators 276 relative to the striplines 275 and adjusting the tuning element 290 may be performed and iterated among the numerous resonators 276 and tuning elements 290 of the resonant cavity filter 250. However, each of the numerous resonators 276, tuning elements 290, and associated components of the filter 250 may have compositions, dimensions, and/or other characteristics that may slightly vary, for example, due to manufacturing, assembly in the resonant cavity filter 250, and/or differences in CTE. For instance, the example resonant cavity filters of FIGS. 10-12 are in-line configurations, each of which include four cavities 270, four resonating elements 276, four tuning elements 290, four coupling transmission lines 275, etc. As such, tuning of the coupling by altering the relative rotation of the resonator(s) 276 and the coupling transmission line(s) 275 as described herein may provide an additional degree of tuning to compensate for tolerance variances of the multiple components 270, 275, 276, 290, etc. That is, tuning of the coupling between the resonator(s) and the coupling transmission line(s) as described herein may be used in conjunction with adjusting of the tuning element 290 to control the frequency response of the resonant cavity filter 250, by accounting for component tolerances due to manufacturing, assembly, and/or thermal drift.

Although illustrated herein primarily with reference to resonators 276 having conical frustum shapes and correspondingly-shaped coupling transmission lines 275 extending along less than an entirety of a periphery thereof, it will be understood that embodiments of the present invention are not limited to these shapes. For example, the resonators 276 may have pyramidal frustum shapes or other polygonal shapes, and the coupling transmission lines 275 may be correspondingly shaped to extend therealong in some embodiments. Likewise, while illustrated herein primarily with reference to head portions 276*h* having protruding lips or rims that extend partially around the circumference of the resonators 276 with uniform width (e.g., in a partial ring- or C-shape) and similarly-shaped portions of coupling transmission lines 275, it will be understood that the lips or rims of the resonators 276 and/or the overlapping portions of the coupling transmission lines 275 may have non-uniform widths or may otherwise have irregular or asymmetrical shapes.

Also, while primarily illustrated herein with reference to annular-shaped rims, it will be understood that the resonating element 276 and/or rims or head portions 276*h* thereof may define square or other polygonal shapes that may be rotated to alter the overlap with the adjacent coupling transmission lines as described herein. In some embodiments, combinations of different shapes for the resonators may be used; e.g., the body of the resonators 276 may have a polygonal shape while the rim or head portion 276*h* may have a circular shape, or vice versa. More generally, while illustrated with reference to particular embodiments, it will be understood that the present invention is not limited to the particular shapes shown in these embodiments, but rather includes variations in the illustrated shapes.

Figure 7:
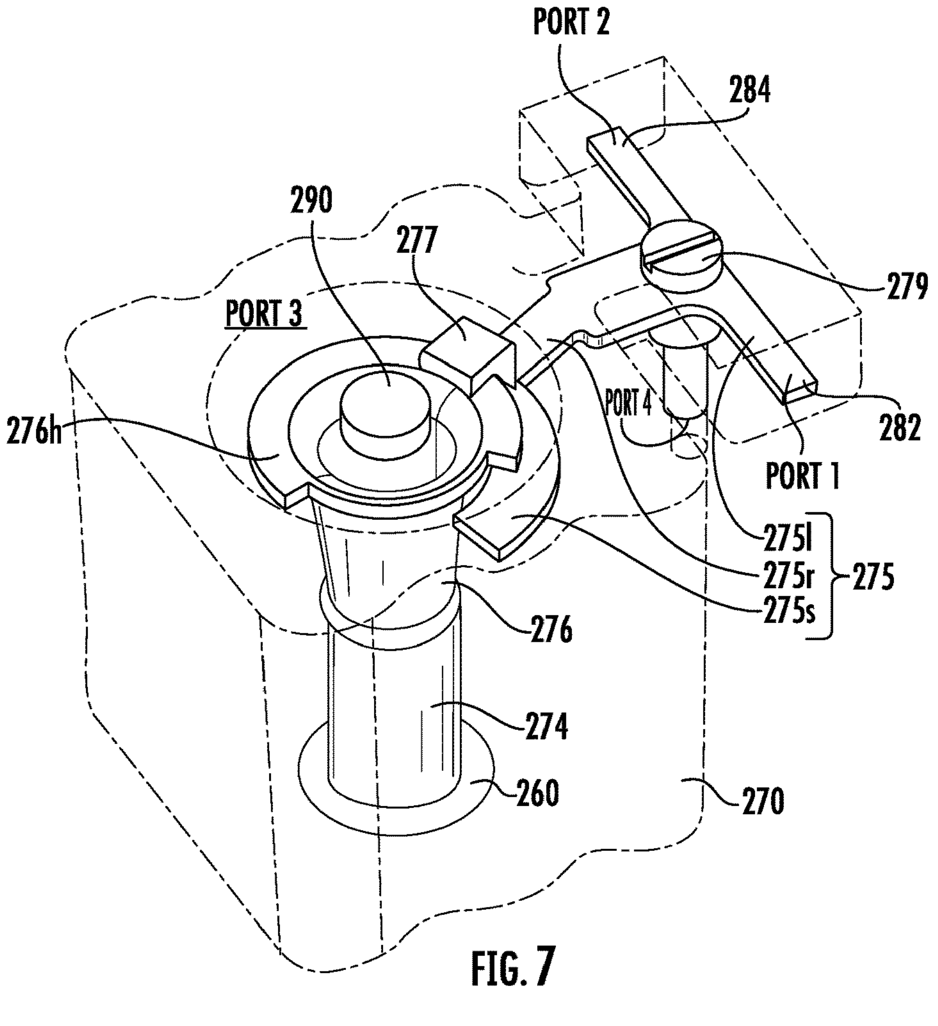
FIG. 7 is a perspective view of a cavity including a resonating element and coupling transmission line according to some embodiments of the present invention.
Figure 8:
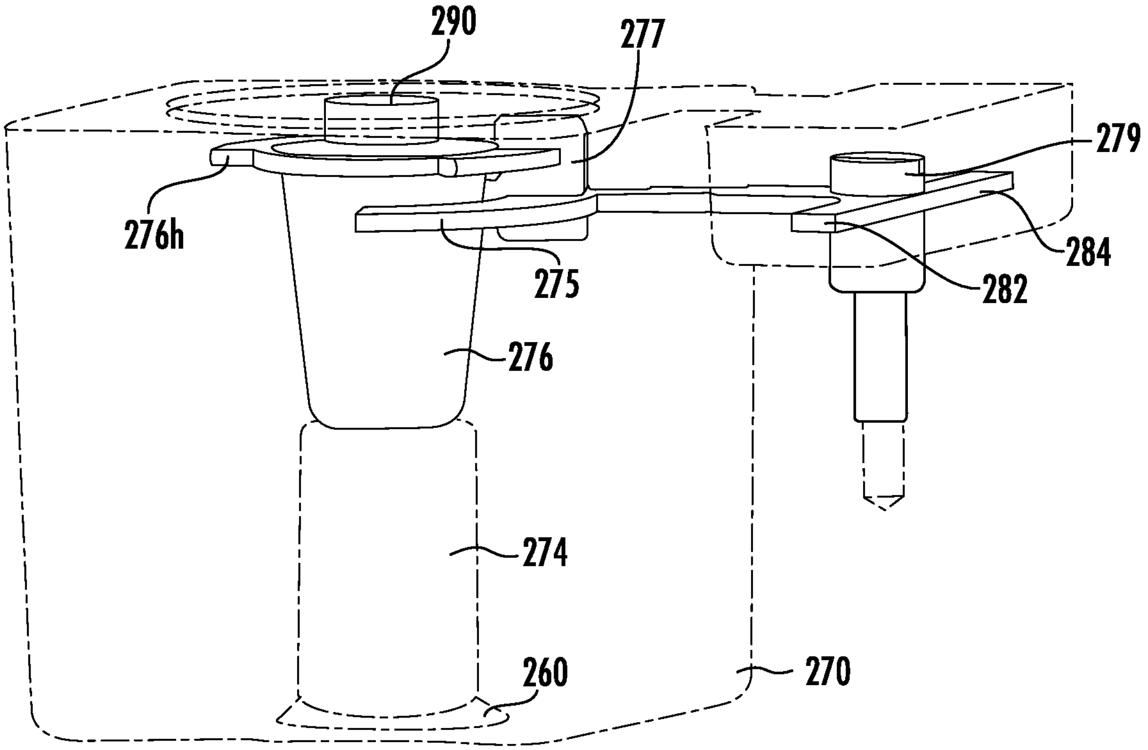
FIG. 8 is a side view of a cavity including a resonating element and coupling transmission line according to some embodiments of the present invention.
Figure 9:
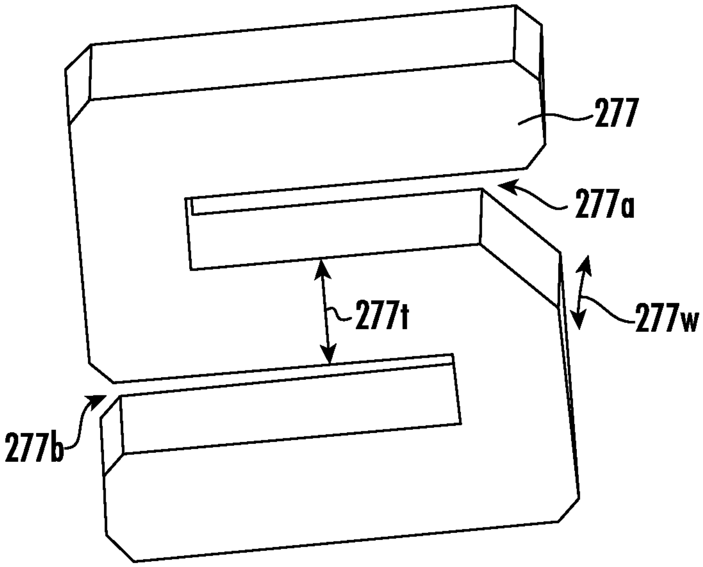
FIG. 9 is an enlarged perspective view of a support member configured to maintain spacing between a resonating element and a coupling transmission line according to some embodiments of the present invention.

FIG. 7 is a perspective view of a cavity including a resonating element and coupling transmission line separated by a support member according to some embodiments of the present invention. FIG. 8 is a side view of the cavity of FIG. 7 illustrating the relative positioning of the resonating element, coupling transmission line, and support member. FIG. 9 is an enlarged perspective view of the support member of FIGS. 7 and 8.

As shown in FIGS. 7-9, the cavity 270 includes the resonating element 276 attached to the column 274 protruding from a floor of the filter housing 260. The coupling transmission line 275 extends partially but not completely around a periphery or circumference of the resonating element 276. In particular, the coupling transmission line 275 includes a partially-circular coupling section 275*s* surrounding or extending around a portion (but less than an entirety) of a periphery of the resonating element 276, a linear portion 275*l*, and an arm portion 275*r* coupled therebetween. The coupling transmission line 275 may further include a mounting section that is secured to the interior of the housing 260 by screws 279. The coupling transmission line 275 may include an input port 282 and an output port 284 for connection to the input and output ports of the resonant cavity filter 250, respectively, or to coupling transmission lines 275 of adjacent cavities 270. The coupling transmission line 275 may be a planar structure including opposing surfaces that are substantially parallel to the floor and top cover 278 of the housing 260, and may be manufactured using a single stamping process in some embodiments.

While illustrated primarily herein as having a partially annular or circular shape, the coupling section 275*s* of the coupling transmission line 275 may have other shapes, which may complement respective shapes of the resonator head 276*h* so as to allow for different relative positions of the resonator head 276*h* and the coupling transmission line 275, which may vary from no overlap to complete overlap in plan view. Also, while illustrated in several embodiments as extending around about half of the periphery of the resonating elements 276, it will be understood that the coupling transmission line 275 may surround less than half or more than half of an adjacent resonating element 276 in some embodiments.

In the examples of FIGS. 7-8, the coupling transmission line 275 may be modelled as including four ports PORT 1, PORT 2, PORT 3, and PORT 4, which may be used to determine matching of resonance frequency, coupling intensity, and loading with the resonators 276. PORT 1 may represent an input port 282 to the cavity 270, from an adjacent cavity or from a signal input port 382 of the filter 250. PORT 2 may represent an output port 284 from the cavity 270, to an adjacent cavity or to a signal output port 384 of the filter 250. PORT 3 may represent a port for tuning of the resonant frequency via adjustment of the tuning element 290. PORT 4 may represent the coupling between the coupling transmission line 275 and the resonator 276, which may be modelled by a circuital tuning element connected between PORT 3 and PORT 4.

Figure 13:
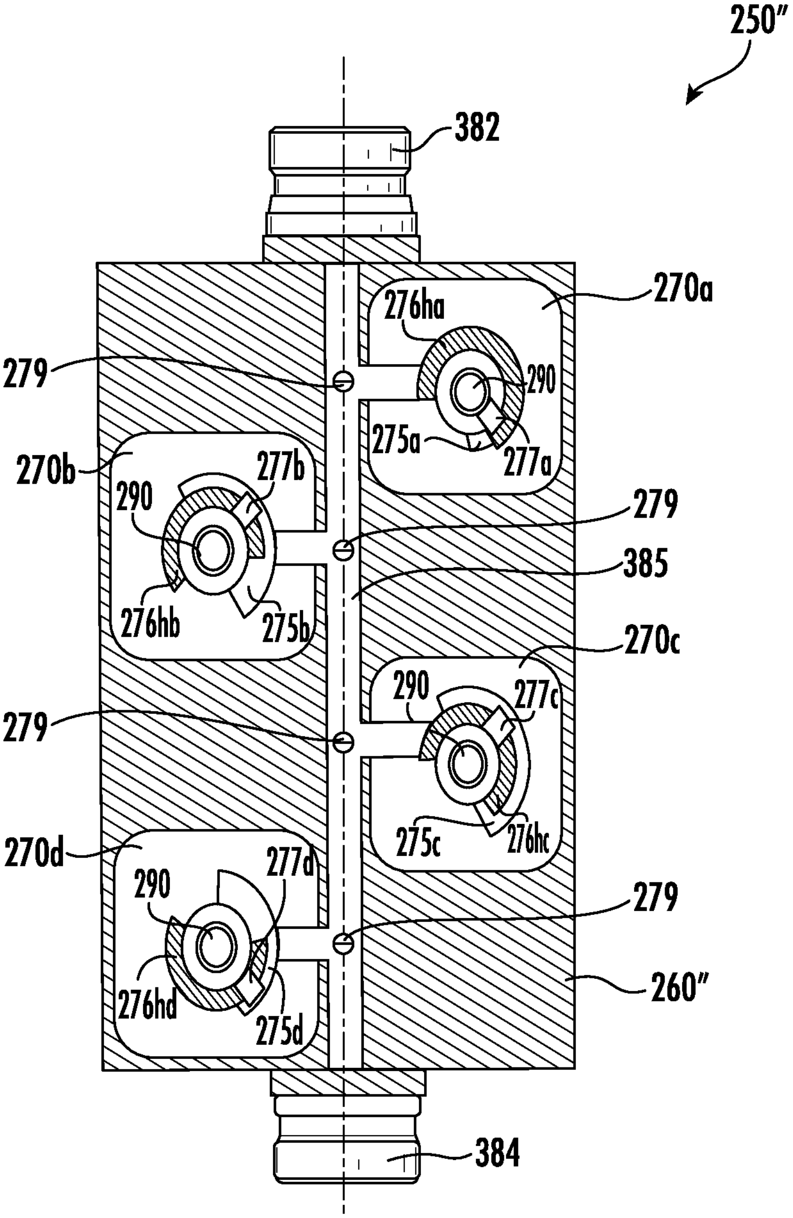

In some embodiments, the coupling transmission line 275 may be integral to or otherwise connected to a main RF transmission line, which extends between a signal input port 382 and a signal output port 384 of the filters 250, 250" (shown in FIGS. 10 and 13). The input port 382 of the filter 250 may be attached to an output port of a transmit path phase shifter (not shown) via a first cabling connection. The output port 384 may be attached to an input port of a receive path phase shifter via a second cabling connection. While illustrated with reference to two-port filters 250/250'/250" herein by way of example, it will be understood that resonating elements 276 that are rotatable relative to coupling transmission lines 275 according to embodiments of the present invention may be similarly applied in other multi-port filter configurations, such as duplexers, diplexers, combiners, and the like.

As shown in FIGS. 8 and 9, the support member 277 is configured to maintain a fixed or desired spacing or distance between the resonator head 276*h* and the coupling transmission line 275. The support member 277 may be formed or otherwise fabricated from a dielectric material. The support member 277 may be sized and shaped to accept a portion (e.g., at least an edge portion) of the resonator head 276*h* in a first groove 277*a* therein, and to accept a portion (e.g., at least an edge portion) of the coupling transmission line 275 in a second groove 277*b* therein. A thickness 277*t* of the support member 277 between the grooves 277*a*, 277*b* may be selected or otherwise configured to provide a desired spacing or distance between the resonator head 276*h* and the coupling transmission line 275. The grooves 277*a*, 277*b* may be shaped to permit rotation of the resonator head 276 while maintaining the fixed spacing or distance relative to the coupling transmission line 275. A width 277*w* of the support member 277 may be selected and/or otherwise configured to reduce or prevent deformation of the resonator head 276*h* and/or the coupling transmission line 275, for example, during rotation and/or thermal cycling.

Although illustrated with reference to a single support member 277, embodiments described herein may include multiple support members 277 spaced apart along portions of the coupling transmission line 275 and/or otherwise around the periphery of the resonator 276 to provide and maintain the desired spacing between the resonator head 276*h* and the coupling transmission line 275. Also, while illustrated with reference to a uniform thickness 277*t*, the thickness 277*t* of the support member 277 may vary along the width 277*w* thereof in some embodiments to vary the distances between the resonator head 276*h* and the coupling transmission line 275 depending on the relative positions thereof, thereby increasing the tunability range of the coupling therebetween.

Tolerance analysis indicates that the tunability range achievable by embodiments of the present invention can address and/or overcome assembling, manufacturing, and/or thermal drift tolerances, which may affect mutual distances between the resonator heads 276*h* and the coupling transmission lines 275. In embodiments including the support member 277, the distance between the resonator heads 276*h* and the coupling transmission lines 275 is maintained by the thickness 277*t* of the support member 277, and further tolerance analysis is based on manufacturing/assembly/thermal drift of the support member 277 as well. Some analysis described herein was performed based on a +/− 0.1 mm tolerance with respect to the thickness 277*t* of the support member 277; however, in some embodiments, the support member 277 may be manufactured to a tolerance with respect to the thickness dimension 277*t* of about +/− 0.05 mm. Bending or deformation (upward/downward) of the coupling transmission line 275 can be simulated by increasing/decreasing the thickness 277*t* of the support member 277 between the stripline 275 and the resonator head 276*h*.

FIG. 10 is a perspective view of a resonant cavity filter 250 including combinations of resonator cavities 270*a*, 270*b*, 270*c*, and 270*d* configured for coupling tuning via rotation of resonator heads 276*ha*, 276*hb*, 276*hc*, and 276*hd* of respective resonators 276 relative to coupling transmission lines 275*a*, 275*b*, 275*c*, and 275*d*, which may be spaced apart by support members 277*a*, 277*b*, 277*c*, and 277*d*, respectively, in accordance with some embodiments of the present invention. FIG. 11 is a plan view of the resonant cavity filter 250 of FIG. 10. Rotation of the resonator heads 276*ha*, 276*hb*, 276*hc*, and 276*hd* relative to the striplines 275*a*, 275*b*, 275*c*, and 275*d* to vary the electromagnetic coupling therebetween may be performed similarly as described above with reference to FIGS. 5-9. Likewise, tuning of the frequency response of the resonators in each of the cavities 270*a*-270*d* by adjusting the penetration or intrusion of tuning elements 290 therein may be performed similarly as described above with reference to FIGS. 5-9.

In the resonant cavity filter 250 of FIGS. 10 and 11, the cavities 270*a*-270*d* are arranged in an in-line configuration, with a main RF transmission line 385 extending between the input port 382 and the output port 384 of the filter housing 260. An input coaxial cable may be coupled to the input port 382 of the filter housing 260, which is coupled to one end of the coupling transmission line 275*a* adjacent the resonator of the first cavity 270*a*. The other end of the coupling transmission line 275*a* is coupled to one end of the coupling transmission line 275*b* adjacent the resonator of the second cavity 270*b*, with the other end of the coupling transmission line 275*b* coupled to one end of the coupling transmission line 275*c* adjacent the resonator of the third cavity 270*c*. The other end of the coupling transmission line 275*c* is coupled to one end of the coupling transmission line 275*d* of the resonator of the fourth cavity 270*d*, with the other end of the coupling transmission line 275*d* coupled to an output port 384 of the filter housing 260. An output coaxial cable may be coupled to the output port 384. As such, the coupling transmission lines 275*a*-275*d* are coupled to the main RF transmission line 385.

The plan view overlap with the coupling transmission lines 275*a*-275*d* may differ based on rotation of the corresponding resonator heads 276*ha*-276*hd*, as well as based on the different sizes and shapes of the resonator heads and coupling transmission lines in FIGS. 10 and 11, with the understanding that there may be a tradeoff between the required or desired resonance frequency and the coupling tunability range achievable by the overlap between the resonator head 276*h* and the adjacent coupling transmission line 275. In particular, the first cavity 270*a* includes a resonator head 276*ha* having a rim width (defined between the inner radius and the outer radius thereof) that is greater than the width of the coupling transmission line 275*a* (defined between the inner radius and the outer radius thereof) surrounding the resonator 276. In particular embodiments, the combination of components 276*ha*, 275*a*, 277*a* of cavity 270*a* may be configured to provide a nominal coupling of about −0.155, a coupling tunability range of about −0.012 to +0.015, and a coupling change due to tolerances (+/− 0.1 mm) of about −0.012 to +0.012. The second cavity 270*b* includes a resonator head 276*hb* having a rim width that is less than the width of the coupling transmission line 275*b* surrounding the resonator 276. In particular embodiments, the combination of components 276*hb*, 275*b*, 277*b* of cavity 270*b* may be configured to provide a nominal coupling of about −0.175, a coupling tunability range of about −0.031 to +0.0179, and a coupling change due to tolerances (+/− 0.1 mm) of about −0.016 to +0.015.

Still referring to FIGS. 10 and 11, the third cavity of 270*c* includes a resonator head 276*hc* having a rim width that is less than about half of the width of the coupling transmission line 275*c* surrounding the resonator 276. In particular embodiments, the combination of components 276*hc*, 275*c*, 277*c* of cavity 270*c* may be configured to provide a nominal coupling of about −0.22, a coupling tunability range of about −0.027 to +0.022, and a coupling change due to tolerances (+/− 0.1 mm) of about −0.025 to +0.023. The fourth cavity of 270*d* includes a resonator head 276*hd* having a rim width that is about equal to the width of the coupling transmission line 275*d* surrounding the resonator 276. In particular embodiments, the combination of components 276*hd*, 275*d*, 277*d* of cavity 270*d* may be configured to provide a nominal coupling of about −0.25, a coupling tunability range of about −0.04 to +0.029, and a coupling change due to tolerances (+/− 0.1 mm) of about −0.013 to +0.017. The relative dimensions and numerical coupling values mentioned above with reference to FIGS. 10 and 11 are specific to providing the desired resonance frequency for the illustrated filter 250, but the present invention is not limited to these values. Rather, the dimensions and/or arrangements of the elements 275, 276*h*, 270, 260, etc. may be varied to alter the coupling tunability as desired and/or required in implementing particular embodiments.

FIGS. 12 and 13 are plan views of a resonant cavity filters 250' and 250", respectively, including resonating elements and coupling lines according to further embodiments of the present invention. In FIGS. 12 and 13, combinations of resonator cavities 270*a*, 270*b*, 270*c*, and 270*d* are configured for coupling tuning via rotation of resonator heads 276*ha*, 276*hb*, 276*hc*, and 276*hd* of respective resonators 276 relative to coupling transmission lines 275*a*, 275*b*, 275*c*, and 275*d*, which may be spaced apart by support members 277*a*, 277*b*, 277*c*, and 277*d*, respectively, as similarly described above with reference to FIGS. 10 and 11.

In the resonant cavity filter 250' of FIG. 12, the cavities 270*a*-270*d* are arranged in an in-line configuration in a housing 260'. However, in FIG. 12, adjacent cavities 270*a*-270*b*, 270*b*-270*c*, and 270*c*-270*d* are coupled through respective coupling windows 260*c* in the filter housing 260' to provide a coupled in-line arrangement. A transmission line 275*l* may provide an additional coupling between two or more cavities (e.g., coupling the non-adjacent cavities 270*a* and 270*c*, or coupling the non-adjacent cavities 270*b* and 270*d*), for example, to realize one or more transmission zeroes. In particular, the transmission line 275*l* may connect coupling transmission line 275*b* of cavity 270*b* with coupling transmission line 275*d* of cavity 270*d*. That is, in the filter 250' of FIG. 12, the additional transmission line 275*l* may be used to couple subsets of resonators 276 in different cavities 270*a*-270*d* to one another, e.g., to provide coupling tunability for a probe used to couple two or more resonators 276. The coupling transmission lines 275*b* and 275*c* of the filter 250' of FIG. 12 may not be directly connected to a main RF transmission line extending between the input port 382 and the output port 384 of the filter housing 260', but rather, coupling transmission line 275*a* may couple cavity 270*a* to the input port 382, and coupling transmission line 275*d* may couple cavity 270*d* to the output port 384.

In the resonant cavity filter 250" of FIG. 13, the cavities 270*a*-270*d* are arranged on both sides of a main RF transmission line 385 extending between the input port 382 and the output port 384 of the filter housing 260". In particular, cavities 270*a* and 270*c* on one side of the main RF transmission line 385 are coupled by coupling transmission lines 275*a* and 275*c*, respectively, while cavities 270*b* and 270*d* on the other side of the main RF transmission line 385 are coupled by coupling transmission lines 275*b* and 275*d*, respectively. As such, in the filter 250" of FIG. 13, the coupling transmission line 275*a*-275*d* are coupled to the main RF transmission line 385 in a different configuration than in the filter 250 of FIGS. 10 and 11.

Figure 15A:
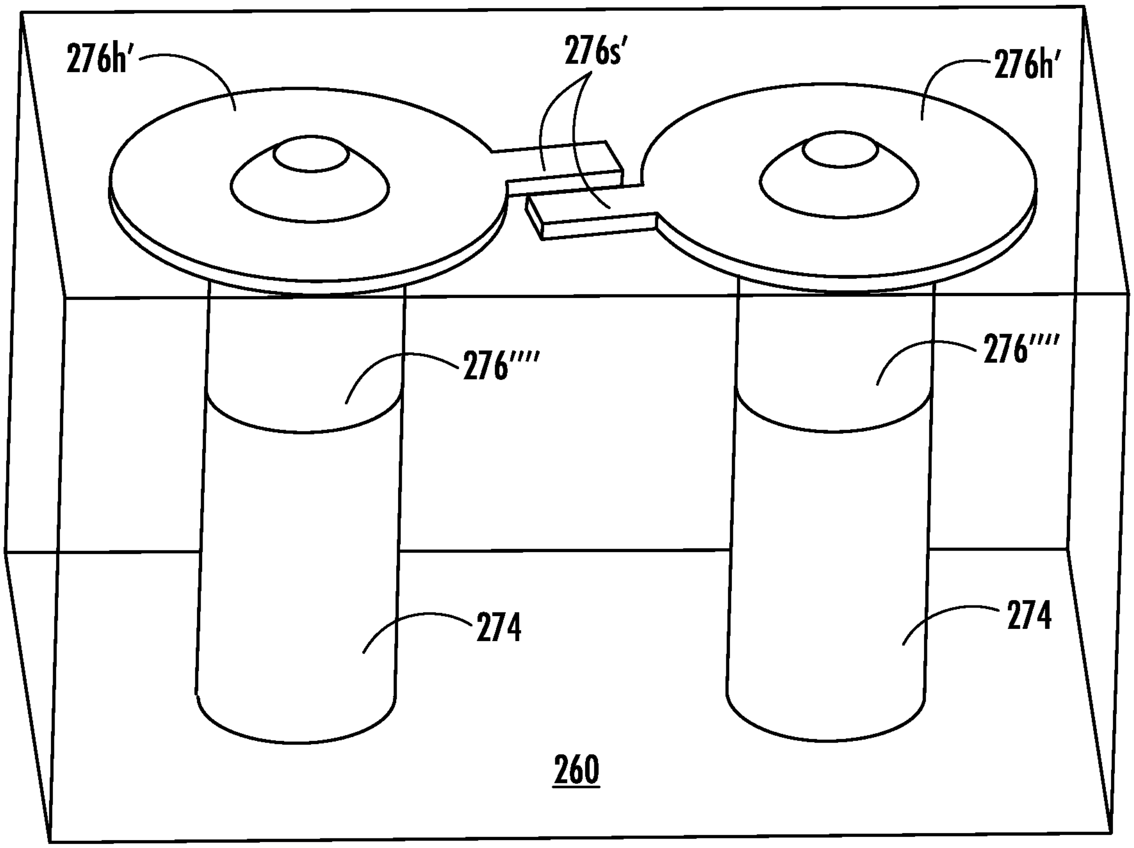
FIGS. 15A and 15B are perspective and plan views, respectively, illustrating example resonating elements according to further embodiments of the present invention in greater detail.
Figure 15B:
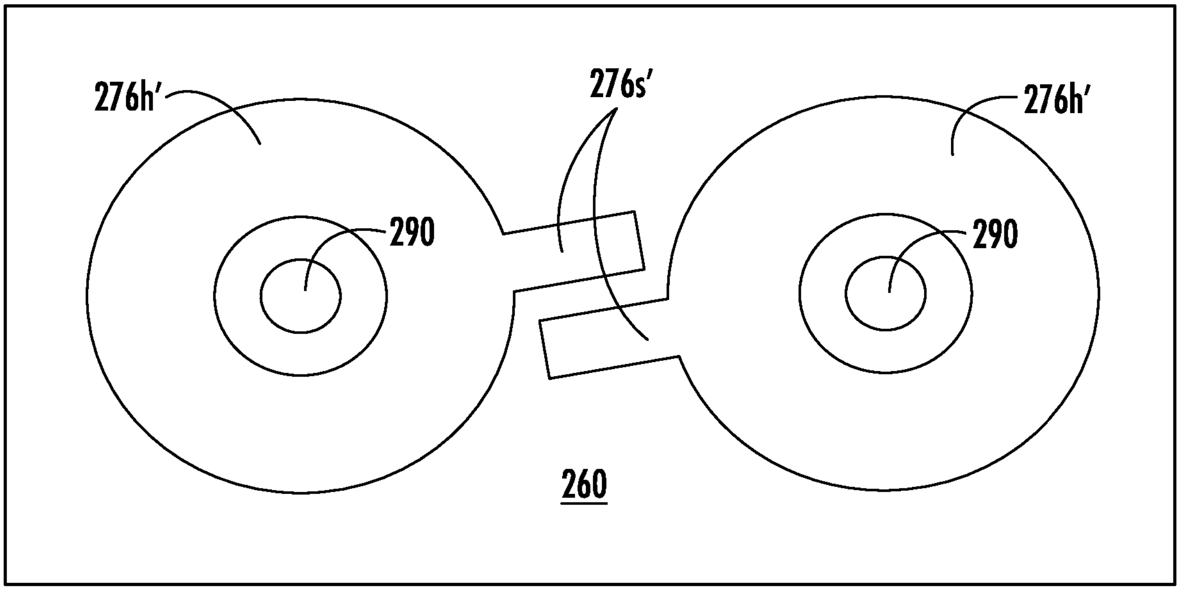

FIGS. 15A and 15B are perspective and plan views, respectively, illustrating example resonating elements according to further embodiments of the present invention in greater detail. The resonators 276" in the examples of FIGS. 15A and 15B can provide coupling tunability through rotation of adjacent resonators 276"" with respective stub portions 276*s*' laterally protruding from edges of the resonator heads 276*h*'. The resonators 276""" may be rotated relative to one another (e.g., using a tuning tool or otherwise as described above) to vary the distance between the stub portions 276*s*', and thus, the electromagnetic coupling between the adjacent resonators 276'. The overall coupling between the adjacent resonators 276"" (given by the sum of magnetic and electric coupling) may be tunable by changing the electric coupling which is based on the distance between stub portions 276*s*'. In some embodiments, the resonators 276"" may include heads having shapes similar to any of the resonator heads 276*h* of FIGS. 14A, 14B and 14C, to avoid any or unintended turn around. Also, although illustrated having symmetric shapes that are each approximately the same height or distance from the floor of the housing 260 in FIGS. 15A and 15B, it will be understood that the adjacent resonator heads 276*h*' may each have different heights and/or shapes, such that rotation of one resonator 276"" relative to the adjacent resonator 276"" may also result in varying plan view overlap of the stub portions 276*s*'.

According to embodiments of the present invention, various aspects of the frequency response of resonant cavity band-stop filters 250, 250', 250" may be adjusted by tuning the resonance frequency of each of the resonating elements 276 via adjustment of the tuning elements 290, as well as by tuning the coupling between each of the resonating elements 276 and the adjacent coupling transmission lines 275. In some example embodiments described herein, the tunability range achievable through rotation of the resonators 276 may be about 10% or more of the nominal coupling, and may be sufficient to compensate for tolerances of up to +/− 0.1 mm or more. The tunability range can be extended by varying the dimensions of the coupling transmission lines 275 adjacent the resonators 276 and/or the extension of the rim along the periphery of the resonators 276, so as to increase the overall range of plan view overlap between the rims or resonator heads 276*h* and the coupling transmission lines 275.

The present invention has been described above with reference to the accompanying drawings, in which certain embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that the terms first, second, etc. may be used herein to distinguish one element from another element. Thus, a first element discussed herein could be termed a second element without departing from the scope of the present inventive concept. The term "and/or" includes any and all combinations of one or more of the associated listed items.

Relative terms such as "below" or "above" or "upper" or "lower" or "horizontal" or "vertical" or "front" or "back" or "top" or "bottom" may be used herein to describe a relationship of one element, layer or region to another element, layer or region as illustrated in the figures. It will be understood that these terms are intended to encompass different orientations of the device in addition to the orientation depicted in the figures.

Aspects and elements of all of the embodiments disclosed above can be combined in any way and/or combination with aspects or elements of other embodiments to provide a plurality of additional embodiments.

In the drawings and specification, there have been disclosed typical embodiments of the invention and, although specific terms are employed, they are used in a generic and descriptive sense only and not for purposes of limitation, the scope of the invention being set forth in the following claims.

The invention claimed is:

1. A resonant cavity filter, comprising:

a filter housing defining an internal cavity therein;

a resonating element in the internal cavity of the filter housing; and a coupling transmission line extending adjacent a periphery of the resonating element in the internal cavity of the filter housing, wherein the resonating element comprises a rim that laterally protrudes from an edge thereof and extends around less than an entirety of the periphery of the resonating element, and is rotatable among respective positions that define differing plan view overlaps between the rim of the resonating element and the coupling transmission line to vary an electromagnetic coupling therebetween.

2. The resonant cavity filter of claim 1, further comprising:

a tuning element that is mounted for coaxial insertion into an interior of the resonating element to adjust a frequency response of the resonant cavity filter.

3. The resonant cavity filter of claim 1, wherein the resonating element is rotatably mounted to the filter housing and is rotatable among the respective positions that define different electromagnetic couplings with the coupling transmission line.

4. The resonant cavity filter of claim 3, wherein the resonating element comprises a resonator head including the rim, and a base opposite the resonator head, wherein the base is rotatably mounted to a column protruding from a floor of the filter housing by a fixing screw, and wherein the fixing screw is configured to secure the resonating element in one of the respective positions after rotation thereof.

5. The resonant cavity filter of claim 4, wherein the base of the resonating element comprises an opening therein exposing the fixing screw, and wherein the opening in the base comprises a patterned driving structure that is configured to mate with an elongated tuning tool that is configured to induce the rotation.

6. The resonant cavity filter of claim 3, further comprising:

at least one support member comprising a first groove that is sized to accept a portion of the rim, and a second groove that is sized to accept an edge of the coupling transmission line adjacent the resonating element, wherein the support member is configured to maintain a spacing between the rim and the coupling transmission line based on a thickness of the support member between the first and second grooves.

7. The resonant cavity filter of claim 6, wherein the thickness of the support member between the first and second grooves is substantially uniform.

8. The resonant cavity filter of claim 3, wherein the rim comprises a partial annular shape.

9. The resonant cavity filter of claim 3, wherein the coupling transmission line comprises a first, linear portion, a second, partial annular portion extending around less than an entirety of the periphery of the resonating element, and an arm portion coupling the first and second portions, wherein rotation of the resonating element among the respective positions defines the differing plan view overlaps between the rim of the resonating element and the second portion of the coupling transmission line.

10. The resonant cavity filter of claim 1, wherein the internal cavity of the filter housing is a first internal cavity and the resonating element is a first resonator, wherein the filter housing further comprises a second internal cavity having a second resonator therein that includes a rim laterally protruding from an edge thereof and extending around less than an entirety of a periphery of the second resonator, and wherein the coupling transmission line further extends adjacent the periphery of the second resonator in the second internal cavity of the filter housing.

11. The resonant cavity filter of claim 10, wherein respective dimensions of the rims of the first and second resonators are different, and/or wherein respective dimensions of portions of the coupling transmission line adjacent the first and second resonators are different.

12. The resonant cavity filter of claim 1, wherein the filter housing further comprises a signal input port and a signal output port that are configured for connection to respective coaxial cables, and wherein the coupling transmission line is coupled to the signal input port and/or the signal output port.

13. A method of tuning a resonant cavity filter, the method comprising:

rotating a resonating element in an internal cavity of a filter housing of the resonant cavity filter relative to a coupling transmission line in the internal cavity of the filter housing extending adjacent a periphery of the resonating element, wherein the resonating element comprises a rim that laterally protrudes from an edge thereof and extends around less than an entirety of the periphery of the resonating element, and is rotatable among respective positions that define differing plan view overlaps between the rim of the resonating element and the coupling transmission line to vary an electromagnetic coupling therebetween.

14. A resonant cavity filter, comprising a filter housing defining a plurality of internal cavities therein; and a respective resonating element in each of the internal cavities of the filter housing, the respective resonating element comprising a base that is rotatably mounted to a floor of the internal cavity, a resonator head that is opposite the base, and a rim laterally protruding from an edge of the respective resonating element between the base and the resonator head, wherein the rim extends around less than an entirety of a periphery of the respective resonating element; and a respective coupling transmission line extending adjacent the periphery of the respective resonating element in each of the internal cavities, wherein the respective resonating element is rotatable among respective positions that define differing plan view overlaps between the rim of the respective resonating element and the respective coupling transmission line.

15. The resonant cavity filter of claim 14, further comprising:

at least one support member comprising a first groove that is sized to accept a portion of the rim of the respective resonating element, a second groove that is sized to accept an edge of the respective coupling transmission line adjacent the respective resonating element, and a portion between the first and second grooves that is configured to maintain a spacing between the rim of the respective resonating element and the respective coupling transmission line based on a thickness.

16. The resonant cavity filter of claim 14, wherein the respective coupling transmission line comprises a first, linear portion, a second, partial annular portion extending around less than an entirety of the periphery of the respective resonating element, and an arm portion coupling the first and second portions, wherein rotation of the respective resonating element among the respective positions defines the differing plan view overlaps between the rim of the respective resonating element and the second portion of the coupling transmission line.

17. The resonant cavity filter of claim 14, wherein the respective coupling transmission lines in two or more of the internal cavities are connected to one another to couple the respective resonating elements in the two or more of the internal cavities.

18. The resonant cavity filter of claim 17, wherein the filter housing further comprises a signal input port and a signal output port that are configured for connection to respective coaxial cables, and wherein the respective coupling transmission lines in the two or more of the internal cavities are connected to the signal input port and/or the signal output port.

* * * * *